No. 771,058. PATENTED SEPT. 27, 1904.
J. GAYLEY.
METHOD OF EXTRACTING MOISTURE FROM AIR FOR BLAST FURNACES
OR CONVERTERS.
APPLICATION FILED FEB. 8, 1904.
NO MODEL. 2 SHEETS—SHEET 2.

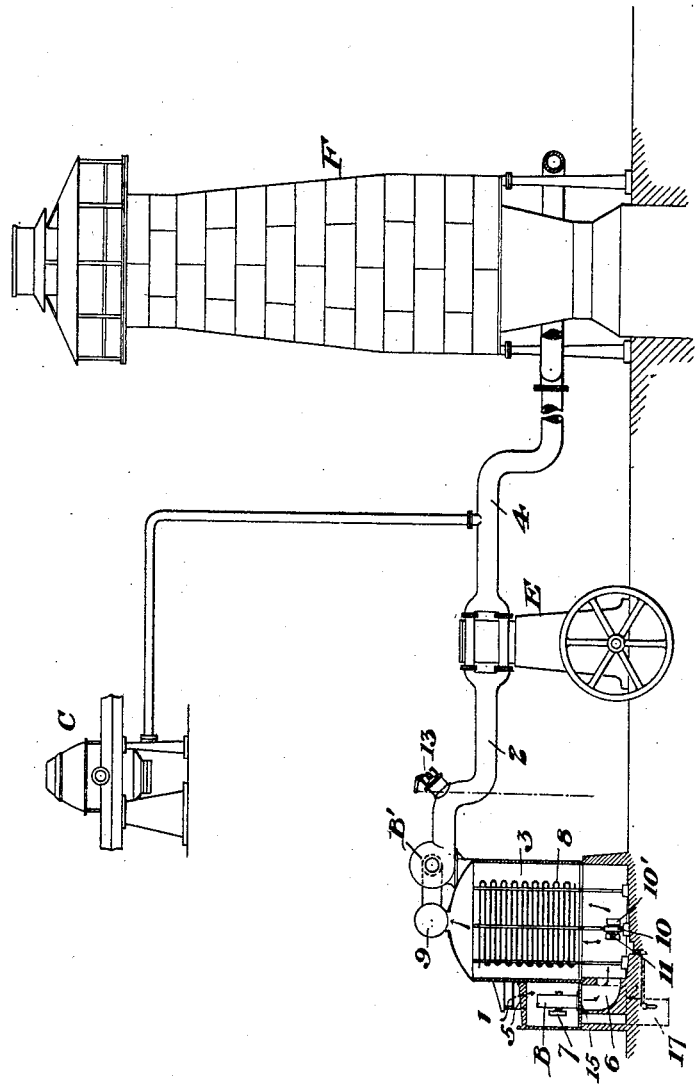

WITNESSES
INVENTOR
James Gayley
by Bakewell & Byrnes
his Attorneys

No. 771,058.

Patented September 27, 1904.

UNITED STATES PATENT OFFICE.

JAMES GAYLEY, OF NEW YORK, N. Y.

METHOD OF EXTRACTING MOISTURE FROM AIR FOR BLAST-FURNACES OR CONVERTERS.

SPECIFICATION forming part of Letters Patent No. 771,058, dated September 27, 1904.

Application filed February 8, 1904. Serial No. 192,543. (No model.)

*To all whom it may concern:*

Be it known that I, JAMES GAYLEY, of New York, county of New York, and State of New York, have invented a new and useful Method of Extracting Moisture from Air for Blast-Furnaces or Converters, of which the following is a full, clear, and exact description, reference being had to the accompanying drawings, forming part of this specification, in which—

Figure 3:
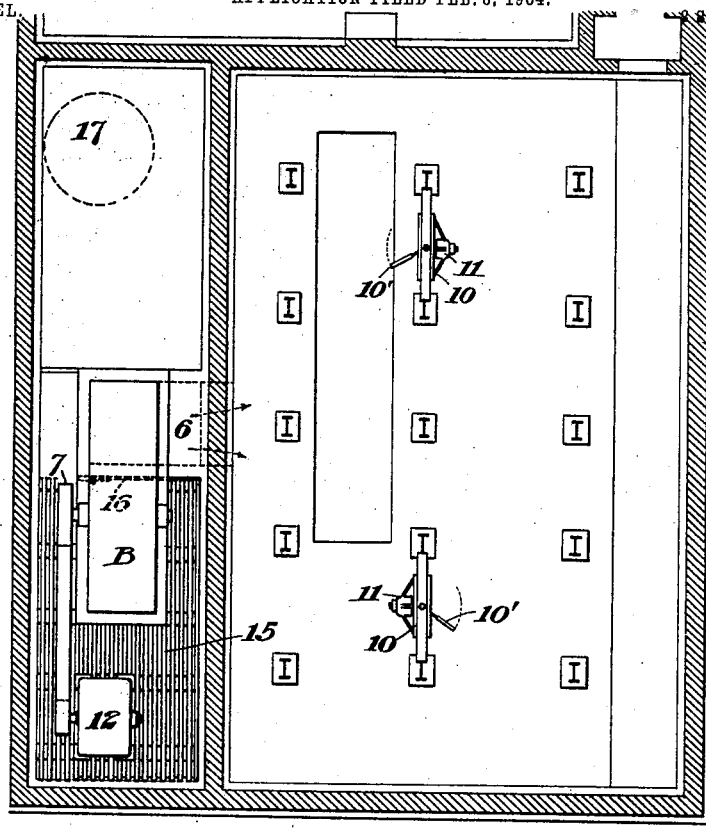
Figure 2:
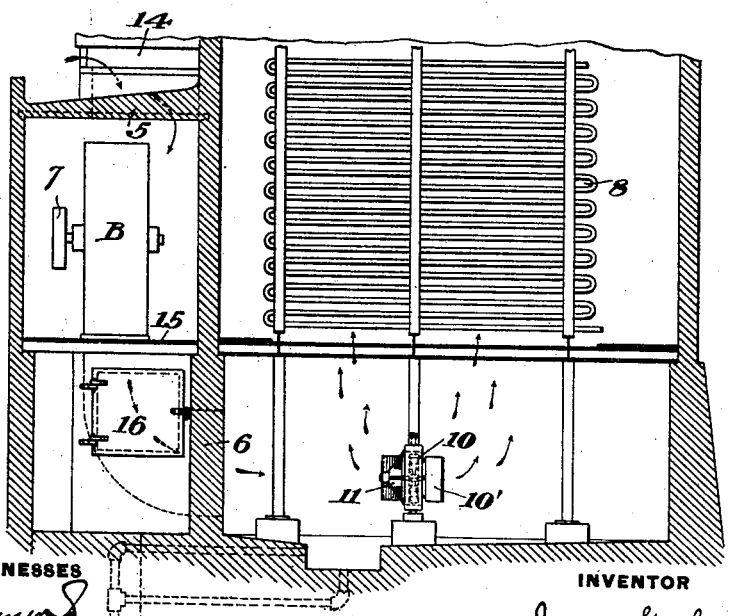

Figure 1 shows in elevation a blast-furnace and converter plant arranged in accordance with my invention. Fig. 2 is a vertical section of the refrigerating apparatus on a larger scale, and Fig. 3 is a horizontal section of the refrigerating-chamber below the coils and showing the distributing-fans.

The present invention relates to the method of feeding air, which is disclosed and claimed in my pending application, Serial No. 181,075, filed November 13, 1903. In the method described in that application the air is artificially cooled to reduce its moisture to a small percentage. The dried air is fed to a blowing-engine by initial pressure of relatively small degree, the pressure of the air is increased at the blowing-engine to a point above its initial compression, and the dried air is forced under compression from the blowing-engine into the furnace or converter and maintained under compression until it enters the furnace or converter. In the said application I show distributing-pipes for the air passing from the fan or initial-pressure device into the refrigerating-chamber.

My present invention relates to an improvement in the feeding of the air into the refrigerating-chamber and distributing it therein; and it consists in agitating or stirring the air in the refrigerating-chamber, preferably by means of fans with oscillating vanes, which will distribute the air more uniformly throughout the refrigerating-chamber.

In the drawings, 2 is the pipe through which the air passes from the refrigerator or drying chamber 3 to the blowing-engine E, and 4 is the pipe conducting the air under compression from the blowing-engine to the furnace or converter.

C represents a converter for the manufacture of steel, and F represents a blast-furnace, into the twyers of which the dried air is delivered from the pipe 4. Air may be drawn by a blower or fan B through the inlet 5 and fed into the refrigerating-chamber through the conduit 6, or the blower B may be dispensed with and a blower B' used instead to aspirate the air through the refrigerating-chamber. B and B' show two locations for the fan, as it may be preferred either to feed or aspirate the air through the refrigerating-chamber; but it is not necessary to use both. When the fan B is used, the air enters the pipe 5 and is forced through conduit 6 by the fan, which is power-driven through the driving-wheel 7, driven by a motor 12.

Instead of using distributing-pipes below the coils in the refrigerating-chamber, as shown in my pending application, I prefer to use means below the coils for stirring and circulating the air in the chamber. For this purpose I show two rotary fans 10, which are mounted in suitable bearings below the coils and may be driven by small electric motors 11. The fans are preferably of the type in which vanes 10' are arranged to oscillate back and forth to direct the air to different points. The vanes gradually change their angle back and forth. The motors for these fans are suitably connected with a source of electric current and are preferably driven continuously. The entire air is put into circulation by these fans and distributed substantially evenly below the refrigerating-pipes 8. The air is thus distributed over the pipes which are cooled to a low temperature by a refrigerant, which is preferably anhydrous ammonia, furnished by an ice-making machine of suitable design. On evaporation it produces a very low temperature, though other refrigerants producing intense cold, such as carbonic anhydrid, may be employed. The moisture in the air is deposited on these pipes, and the dried air passes into a receiving-chamber 9, and thence through the pipe 2 to the blowing-engine E, from where it is delivered to the furnace or converter. If the blower or fan B' is used, the fan B is dispensed with and the air is aspirated from the inlet-pipe 5 to the blower B' and then fed into the high-pressure blowing-engine E. If for any reason the blower B should become inoperative, the air would pass through the hood or air-inlet 14 and opening 5 of the fan-room and through the open floor 15 of the fan-room into the cellar and into the fan discharge-pipe 6, through a door 16, which should be opened as soon as the fan is not in operation. A by-pass is thus provided for the air. If the blower B' is used, a special by-pass must be provided to admit air to the engine when the fan becomes inoperative.

On the pipe 2 is a valve 13, which is used when the engine E is not in operation. When this valve is opened, a small current of air from the blower flows through the refrigerating-chamber out of the valve-opening, thus maintaining the refrigerator appliance in normal working condition and by the refrigerant absorbing heat preventing the frosting of the refrigerant-pipes. The blower B or B' is auxiliary to the blowing-engine E. It is valuable because it relieves the blowing-engine of a large amount of work due to the back pressure or exhaustion of air through the conduits and lines of refrigerating-coil which obstruct its free passage and would cause the engine to draw in less air than if the inlet-valve were freely exposed to the atmosphere. The pressure developed by the blower is much smaller than that developed by the blowing-engine E and need only be very small, one ounce or less, and even if only sufficient pressure is developed thereby in the refrigerating-chamber to give the normal atmospheric pressure at the engine inlet-valve the advantage of the auxiliary blower would still be practically attained. The air that is propelled by the blower B or B' passes through the distributing-pipe 6 into the refrigerating-chamber 3 and is evenly distributed below the coils by the fans. It then flows upwardly and around the coils of pipe 8, which are very cold, due to the refrigerating fluid, and on these pipes the moisture is preferably condensed in the form of frost. It then passes into the receiver 9, then through conduit 2 to the blowing-engine, from which it is fed under pressure to the furnace or converter either directly or through a stove and maintained under pressure from the time it leaves the engine until it enters the furnace or converter. When the pipes in the refrigerating-chamber become covered with frost, the frost is thawed off by passing the hot ammonia-gas through one of the coils or series of coils, and the water melted therefrom will collect in the pit 17 and can be withdrawn. Meanwhile the series of the coils can be used with refrigerant in the usual way, and by thus thawing the series successively, instead of thawing all of them at once, the operation of the apparatus is not interrupted and can be made continuous in a single chamber.

Various arrangements of these appliances will be suggested to those skilled in the art without affecting my invention, which consists principally in the introduction of means for stirring and circulating the air in the refrigerating-chamber. Advantages can also be had in regenerating the air by causing the dry and cold air proceeding from the refrigerator-chamber to pass through pipes, the latter being in contact with the air led from the atmosphere to the refrigerating-chamber, and thereby securing a perceptible reduction in the temperature of inflowing air.

My invention can be applied to drying the air for use in open-hearth furnaces and for other purposes in the arts wherein dry air is an important factor.

The advantages of my present invention result from the use of the means for circulating or stirring the air to distribute it over the cooling-pipes. In this manner I prevent uneven cooling action upon the air and obtain better results.

I claim—

1. The method of feeding the air-blast to blast-furnaces or converters which consists in feeding the air into a refrigerating-chamber, distributing it therein in a current directed successively in varying directions, artificially cooling the air in the chamber to reduce its moisture to a small percentage, supplying the dried air to a blowing-engine, and feeding the dried air therefrom under compression into the furnace or converter; substantially as described.

2. The method of feeding air-blast to blast-furnaces or converters, consisting in feeding the air into a refrigerating-chamber, forcibly distributing it therein in a current directed successively in varying directions, and cooling it artificially to reduce its moisture to a small percentage, feeding the dried air to a blowing-engine by initial pressure of relatively small degree sufficient to overcome in whole or in part the friction of the air-current in the apparatus, increasing its pressure at the blowing-engine to a degree above that to which it was initially subjected and feeding the dried air therefrom under compression into the furnace or converter, and maintaining it under compression from the time it leaves the blowing-engine until it enters the furnace or converter; substantially as described.

In testimony whereof I have hereunto set my hand.

JAMES GAYLEY.

Witnesses:
J. W. ALLEN,
D. H. McCLOSKEY.